United States Patent [19]

Ikefuji et al.

[11] Patent Number: 5,311,296
[45] Date of Patent: May 10, 1994

[54] VIDEO SIGNAL GENERATOR CIRCUIT AND VIDEO IMAGE PROCESSING DEVICE USING THE SAME

[75] Inventors: Yoshihiro Ikefuji; Sadakazu Murakami, both of Ukyo, Japan

[73] Assignee: Rohm Co., Ltd., Kyoto, Japan

[21] Appl. No.: 974,885

[22] Filed: Nov. 12, 1992

[30] Foreign Application Priority Data

Nov. 12, 1991 [JP] Japan .................................. 3-323701
Nov. 12, 1991 [JP] Japan .................................. 3-323702

[51] Int. Cl.⁵ ........................ H04N 11/20; H04N 7/01
[52] U.S. Cl. .................................... 348/505; 348/500; 348/713; 348/708
[58] Field of Search .................... 358/11, 12, 19, 140, 358/141, 17, 18, 40, 24, 21 R; H04N 11/20, 7/07

[56] References Cited

U.S. PATENT DOCUMENTS 4,263,608  4/1981  Hinn ........................... 358/21 R
4,688,082  8/1987  Kato ........................... 358/21 R Primary Examiner—James J. Groody
Assistant Examiner—Glenton B. Burgess
Attorney, Agent, or Firm—Fay, Sharpe, Beall, Fagan, Minnich & McKee

[57] ABSTRACT

A state memory circuit responsive to a selection signal indicative of either the first television system or the second television system selected according to an external setting operation and adapted to be set to a logical "1" or "0" state when the selection signal indicates that the first television system is selected, the state of the state memory circuit being alternated between "1" and "0" for every signal according to the burst flag pulse when the selection signal selects the second television system, and a timing circuit for outputting the state of the state memory circuit at a timing before a leading edge of the burst flag pulse or after a trailing edge of the burst flag pulse and responds to an even number of burst signals in one frame and generates a color video signal suitable to the first or the second television system according to the selection signal.

12 Claims, 5 Drawing Sheets

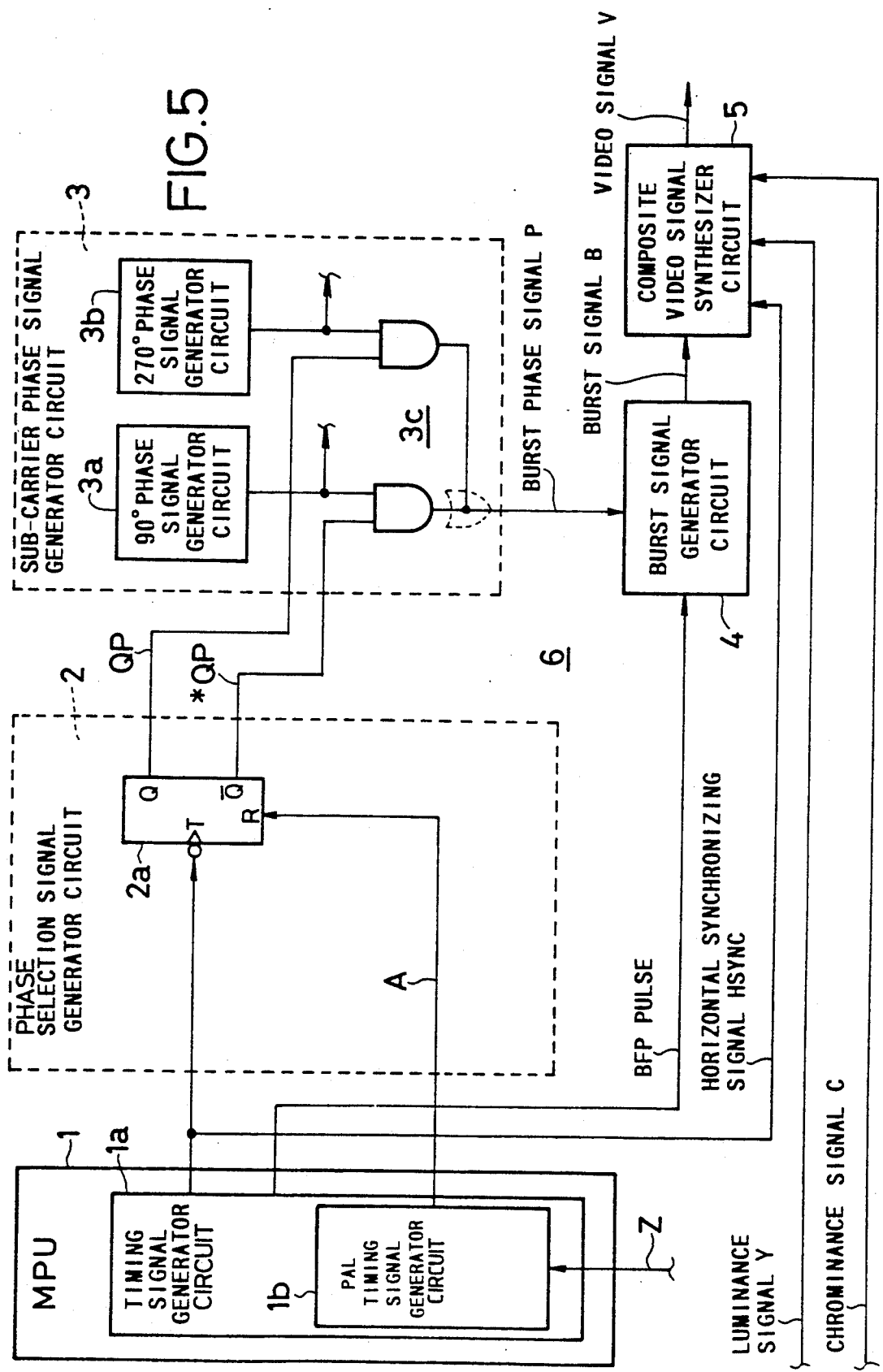

VIDEO SIGNAL GENERATOR CIRCUIT AND VIDEO IMAGE PROCESSING DEVICE USING THE SAME

BACKGROUND OF THE INVENTION

1. Field of the Invention

The present invention relates to a video signal generator circuit and a video image processing device using the same and, particularly, to an improvement of a burst signal generator circuit of a video signal generator circuit, which can be adapted to both NTSC television system and PAL television system.

2. Description of Prior Art

A color video signal generator circuit has been included in a video image processing device such as terminal device of a video game device, a video tape recorder or a computer, generally. Such video signal generator circuit functions to generate a composite signal which is displayed on a monitor television receiver. Particularly, in a case of a home video game device or video tape recorder, a commercially available TV receiver is used therefor rather than a special display device dedicated thereto. Therefore, the composite signal to be generated by such video signal generator circuit should be suitable for such commercially available TV receiver.

Such composite video signal is usually prepared according to a standard which is specific for a television system. There are several different television systems such as NTSC, PAL and SECAM, etc., and, therefore, there are several standards. When dedicated circuits or IC's are prepared for the respective standards, the manufacturing efficiency can not be improved. Under the circumstance, a color video signal generating circuit which can be used commonly for a plurality of television systems such as NTSC and PAL has been required and now available commercially.

For PAL and NTSC systems, they are different in the number of scan lines. Further, in PAL, that is, "Phase Alternation by Line" system, phase of color sub-carrier is inverted every scan line and hence phase of burst signal necessary for transmission of phase of the sub-carrier signal to a receiver side is also inverted. On the other hand, there is no phase inversion of a color sub-carrier signal in NTSC. In this specification, PAL will be described as a typical example of the television systems in which the phase of sub-carrier is inverted every scan line and NTSC will be described as an example of television systems in which there is no such phase inversion.

FIG. 5 is a block circuit diagram showing a conventional color video signal generator circuit.

In FIG. 5, a color video signal generator circuit 6 includes a processor (MPU) 1, a phase selection signal generator circuit 2, a sub-carrier phase signal generator circuit 3, a burst signal generator circuit 4 and a composite video signal synthesizer circuit 5 and operates, in response to a horizontal synchronizing signal HSYNC and a PAL timing signal A, etc., supplied from the MPU 1 which controls timings of a television signal, to generate the composite color video signal V.

The MPU 1 includes a timing signal generator circuit 1a in the form of a program or a logic circuit constituted by a gate array. The timing signal generator circuit 1a includes a PAL timing signal generator circuit 1b. The MPU 1 generates various timing signals for a television signal, such as horizontal synchronizing signal, vertical synchronizing signal and equalizing signal, etc., and controls an operation of the whole video signal generator circuit 6. In FIG. 5, only necessary means and signals are shown for simplicity of illustration.

The timing signal generator 1a generates, in addition to the timing signals, a burst flag pulse BFP (referred to as "BFP pulse" hereinafter) indicative of a position of a back porch of horizontal synchronizing signal into which a color burst is inserted.

The PAL timing signal generator 1b receives an external NTSC/PAL selection signal Z (referred to as "selection signal Z" hereinafter) for selecting either NTSC system or PAL system. The selection signal Z is, for example, a H (high level) signal for NTSC and a L (low level) signal for PAL. When the selection signal Z is L indicating PAL selected, the PAL timing signal generator 1b generates a PAL timing signal A of a fixed level every switching between frames for setting phase of a sub-carrier signal of a first scan line of the next frame to a predetermined phase. On the other hand, when the selection signal Z is H indicating NTSC, the PAL timing signal A from the PAL timing signal generator 1b resets a toggle type flip-flop 2a constituting the phase selection signal generator circuit 2.

The flip-flop 2a is triggered at a trailing edge of the horizontal synchronizing signal HSYNC received at a trigger terminal thereof and set to logical "1". When the flip-flop 2a receives at its reset terminal R the PAL timing signal A in the fixed level, it is reset to logical "0". A Q output and an inverted Q output (indicated by "*Q") of the flip flop 2a are supplied to the sub-carrier phase signal generator circuit 3 as selection signals, respectively.

The sub-carrier phase signal generator circuit 3 includes a 90° phase signal generator circuit 3a corresponding to a (R-Y) signal axis with respect to a (B-Y) signal axis as a reference and a 270° phase signal generator circuit 3b. Further, the sub-carrier phase signal generator circuit 3 includes a gate circuit 3c including a pair of gates and selects a 90° phase signal from the 90° phase signal generator circuit 3a when it receives the selection signal *QP and a 270° phase signal when it receives the selection signal QP. Either the 90° phase signal or the 270° phase signal thus selected is supplied to the burst signal generator circuit 4 as a burst phase signal P.

The burst signal generator circuit 4 responds to the BFP pulse from the timing signal generator 1a and the burst phase signal P to generate a burst signal B which is sent to the composite video signal synthesizer circuit 5 for a duration of the BFP pulse. The composite video signal synthesizer circuit 5 synthesizes, from the horizontal synchronizing signal HSYNC, the burst signal B, a luminance signal Y and a chrominance signal C, a color composite video signal V having a color burst inserted into the back porch of the horizontal synchronizing signal HSYNC, which is supplied externally as an output of the video signal generator circuit 6.

In the video signal generator circuit 6 constructed as mentioned above, it is possible to generate a burst signal of a proper phase regardless of the television system selected by setting the value of the selection signal Z at an assembling stage or a regulating stage of a device having the circuit incorporated therein.

When a system other than PAL, for example, NTSC is selected, the PAL timing signal A resets the flip-flop 2a of the phase selection signal generator circuit 2. As a result, the flip flop 2a outputs the selection signal *QP, so that the 90° phase signal is selected as the sub-carrier signal. Therefore, the phase of the burst signal is fixed to 90° phase with which a composite video signal V suitable to the NTSC standard is produced.

On the other hand, when the PAL system is selected, the flip-flop 2a is inverted for every horizontal synchronizing signal HSYNC since there is no PAL timing signal A generated within one frame. Therefore, the phase selection signals QP and *QP are output alternately. As a result, the 90° phase signal and the 270° phase signal are alternately output as the burst phase signal P and thus the burst signal B is inverted in phase for every scan line, with which a composite video signal V suitable for PAL standard is generated.

What is important in this case is that the sub-carrier signal for PAL must be generated prior to generation of the BFP pulse. Otherwise, it is impossible to extract the sub-carrier sufficiently by the BFP pulse. For this reason, the horizontal synchronizing signal HSYNC which is generated prior to generation of the BFP pulse is used for switching of the sub-carrier signal, as mentioned previously.

The timing signals from the timing signal generator circuit 1a include the vertical synchronizing signal and the equalizing signal in addition to the horizontal synchronizing signal, as mentioned previously. Therefore, when the number of the horizontal synchronizing signals HSYNC for one frame is odd and when no means for processing this is provided, phase of the burst signal of a next frame is deviated in PAL, causing it to be inadequate for the PAL standard. In order to prevent such phenomenon, the PAL timing signal generator 1b generates the PAL timing signal A for every switching between frames to match the phase of the burst signal between frames.

In detail, the PAL timing signal A is generated at a timing of switching from one frame to the next, by which the flip flop 2a is reset to thereby provide the selection signal *QP. Therefore, the 90° phase signal is selected as the sub-carrier for every frame switching, so that the phase of the sub-carrier for a first scan line of the next frame is set to 90°.

As described, in the conventional circuit which is selectively operable in NTSC and PAL, it is necessary to generate such PAL timing signal A as mentioned for every switching to PAL. The PAL timing signal A must be fixed in period thereof and in relation to other timing signals, otherwise, the sub-carrier of the final composite video signal V is degraded largely thereby, resulting in colorless display on a receiver side. Therefore, the load on the MPU for accommodating generation of such precise PAL timing signal is large or a large circuit is required therefor.

On the other hand, the MPU is used as a substitution for a timing control circuit, etc., of a conventional television signal. Therefore, in view of economy, it is difficult to use an expensive processor therefor, while it has been usual to design the system such that the number of timing signals for the television signal to be generated by a MPU is as large as possible.

In addition, in a recent video image processor for a video game, etc., the requirement of grade-up of its performance is increasing, upon which load on a MPU is further increased. However, a MPU having timing signal generators for generating such timing signals as PAL timing signal A, the processing condition of which is very severe, can not respond to such new performance requirement.

SUMMARY OF THE INVENTION

An object of the present invention is to provide a video signal generator circuit which is capable of selecting either NTSC system or PAL system without requiring an external PAL timing signal.

Another object of the present invention is to provide a video signal generator circuit which includes a MPU for timing control of a television signal and is capable of selecting either NTSC system or PAL system without requiring any external PAL timing signal, by merely adding a simple circuit.

A further object of the present invention is to provide a video processor which includes a MPU for timing control of a television signal, is capable of selecting either NTSC system or PAL system without requiring any external PAL timing signal and can easily cause the MPU to respond to an additional functional requirement.

According to the present invention, the above mentioned objects can be achieved by a video signal generator circuit functioning as a selection signal generator circuit. The video signal generator circuit comprises a state memory circuit as a selection signal generator circuit for selecting one from sub-carrier signals. The state memory circuit is responsive to a selection signal Z generated according to an external setting operation and set to "1" or "0" when the selection signal indicates a first television system and alternatively set to the logical values "1" and "0" for every BFP pulse when the selection signal indicates a second television system. The video signal generator circuit further includes a timing circuit which outputs the state of the state memory circuit at a timing preceding a leading edge of the BFP pulse or succeeding to a trailing edge of the BFP pulse when the second television system is selected. Therefore, the video signal generator circuit receives an even number of the BFP pulses in one frame and generates a color video signal in either of the first television system or the second television system according to the selection signal Z.

An example of the selection signal generator circuit comprises a delay circuit responsive to a BFP pulse and a horizontal synchronizing signal supplied externally for delaying the horizontal synchronizing signal to the extent that it does not overlap with the BFP pulse, a first flip-flop adapted to be reset by a signal from the delay circuit and set at a leading edge of the BFP pulse and a second flip-flop adapted to be inverted at a leading edge of the horizontal synchronizing signal when the NTSC/PAL selection signal indicates PAL and reset when the selection signal does not indicate PAL, and an output of the second flip-flop is output to the sub-carrier signal generator circuit as the sub-carrier signal selection signal. In this case, the first and second flip-flops constitute the state memory circuit and the delay circuit and the horizontal synchronizing signal constitute the timing circuit for switching the color sub-carrier signal at a timing before the leading edge of the BFP pulse.

As another example, a toggle type flip-flop which inverts its state for every BFP pulse is provided as the state memory circuit and a logic circuit such as Exclusive-OR is provided as the timing circuit for switching the sub-carrier signal at a timing after the trailing edge of the BFP pulse.

In the video signal generator circuit having such construction as mentioned above, the switching of the sub-carrier is performed by the delay circuit prior to generation of the BFP pulse when PAL is selected. The selection signal generator circuit receives only the BFP pulse and the horizontal synchronizing signal as the timing signal and the first and second flip-flops generate a suitable selection signal which is supplied to the sub-carrier signal generator circuit.

That is, when the selection signal Z does not indicate PAL, the second flip-flop is always reset and the Q and *Q outputs thereof are fixed to "0" and "1", respectively. Therefore, it is possible for the sub-carrier signal generator to always select the first sub-carrier signal as the suitable sub-carrier signal. On the other hand, when the selection signal Z indicates PAL and the first flip-flop is set, the second flip-flop is inverted at a leading edge of the horizontal synchronizing signal indicating a start of a next scan line under control of the timing circuit for every not equivalent pulse but BFP pulse which is generated correspondingly to existence of an actual horizontal scan line. Therefore, undesired influence of the equalizing pulse, etc., inserted between frames is avoided. Further, since the number of BFP pulses received is even, initial phases of the respective frames are identical and there is no change in phase between frames. The above matters are true in the case where the toggle type flip-flop whose state is inverted every BFP pulse and the timing circuit for switching the sub-carrier signal at a timing after the trailing edge of the BFP pulse are used.

Therefore, the selection signal generator circuit does not require PAL timing signal even when PAL is selected. As a result, the PAL timing generator to be provided within the MPU for performing the timing control for television signal becomes unnecessary.

With a minor change of circuit, such as addition of a flip-flop, the load on the timing control processor for a television signal is reduced, resulting in an increased extra processing capacity. Therefore, it is possible to load another program or programs on the MPU or the logic circuit, which is used as the PAL timing generator and thus can be used for another purpose. Thus, an inexpensive MPU can accommodate to a functional expansion such as increase of performance or function.

BRIEF DESCRIPTION OF THE DRAWINGS

FIG. 5 is a block circuit diagram of a conventional video signal generator circuit.

DETAILED DESCRIPTION OF THE PREFERRED EMBODIMENTS

Figure 1:
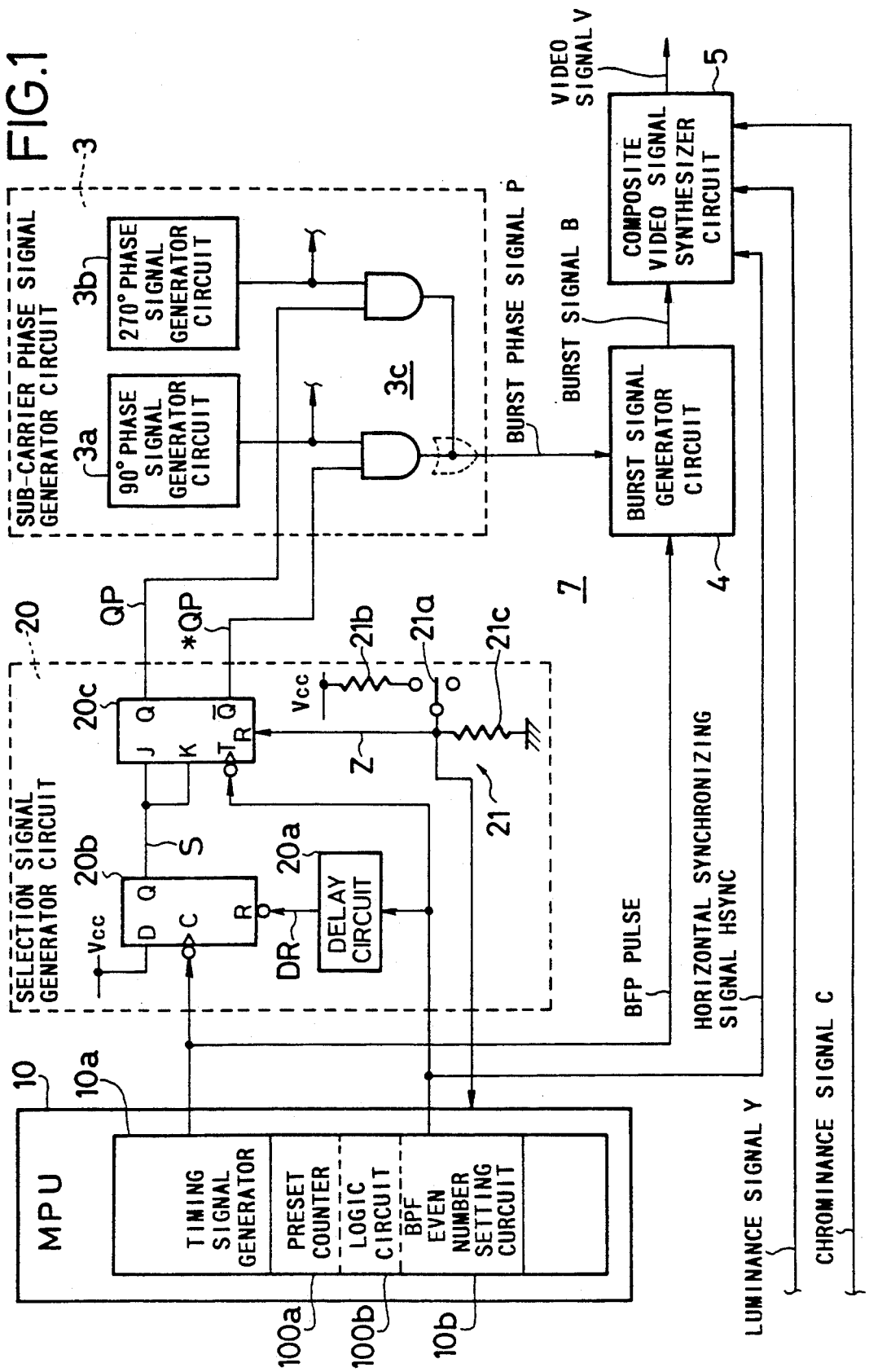
FIG. 1 is a block circuit diagram of an embodiment of the present invention.

FIG. 1 shows a video signal generator circuit according to an embodiment of the present invention. In FIG. 1, the video signal generator circuit 7 shown in FIG. 1 differs from the conventional video signal generator circuit 6 shown in FIG. 5 in that a MPU 10 corresponding to the conventional MPU 1 in FIG. 5, does not include a PAL timing signal generator but does include a timing signal generator 10a including a preset counter 100a, a logic circuit 100b and a BFP even number setting circuit 10b and in that a selection signal generator circuit 20 is used instead of the conventional selection signal generator circuit 2. When the preset counter 100a and the logic circuit 100b are realized by a program, the preset counter 100a may be provided in a memory as a soft counter and the logic circuit 100b may be realized by logic condition processing. Other portions of the construction shown in FIG. 1 are the same as those shown in FIG. 5 and depicted by the same reference numerals, respectively, without detailed description thereof.

The timing signal generator 10a controls the whole video signal generator circuit 7. The timing signal generator 10a generates a BFP pulse and a horizontal synchronizing signal HSYNC. When the timing signal generator circuit 10a receives, for example, a PAL setting signal, that is, when a selection signal Z is "L", the BFP even number setting circuit 10b and hence the timing signal generator circuit 10a generates 626 BFP pulses which is a sum of 625 BFP pulses produced correspondingly to 625 horizontal scan lines per field in the PAL system plus 1 BFP pulse. The preset counter 100a responds to BFP pulses or the horizontal synchronizing signal HSYNC from the timing signal generator circuit 10a to count them up to a value preset therein, here, 625, and then generate an additive BFP pulse. In the case where the preset counter is the soft counter, 625 is set in the memory as an initial value and is counted down therefrom.

BFP pulses are generated by the timing signal generator circuit 10a correspondingly to the horizontal synchronizing signal for a period of color burst insertion and not generated during a vertical synchronizing signal period and equalizing signal periods.

The selection signal generator circuit 20 includes a delay circuit 20a, a first flip-flop 20b and a second flip-flop 20c and generates selection signals QP and *QP in response to the selection signal Z, the BFP pulses and the horizontal synchronizing signal HSYNC.

The delay circuit 20a functions to delay the horizontal synchronizing signal HSYNC to the extent that the latter does not overlap with the BFP pulses to thereby produce a signal DR. The first flip-flop 20b is reset by the signal DR. The flip-flop 20b is set by a leading edge of a subsequently generated BFP pulse and outputs a signal S at its Q output while storing it as a logical value "1". The signal S corresponds in timing to the BFP pulse. The second flip-flop 20c is, for example, a J-K flip-flop and receives the signal S at its J and K inputs, the horizontal synchronizing signal HSYNC at its clock terminal T and the selection signal Z at its reset terminal R.

The flip-flop 20c in a set state receives the signal S and its state is inverted for every horizontal synchronizing signal HSYNC generated immediately before the BFP pulse. Therefore, the delay circuit 20a for delaying the horizontal synchronizing signal HSYNC forms a timing circuit for switching the sub-carrier for every reception of the BFP pulse at a timing prior to a leading edge of the BFP pulse.

In this embodiment, the state of the selection signal Z is determined by a switch circuit 21. The switch circuit 21 is constituted with a dip switch 21a, a pull-up resistor 21b and a pull-down resistor 21c. When a series circuit of the resistors 21b and 21c is formed by the switch 21a, the selection signal Z becomes "H", otherwise, "L". The selection signal Z is "H" for NTSC and "L" for PAL. The selection signal Z is supplied to the MPU 10 which activates the BFP even number setting circuit 10b when the signal Z is "L" to increase the number of BFP pulses by 1. The selection signal Z may be supplied externally or generated by the MPU 10.

When NTSC is selected by the selection signal Z of "H", the second flip-flop 20c is reset thereby and outputs the selection signal *QP. Therefore, the 90° phase signal is selected as the sub-carrier signal with the phase relation between the burst signal B and the sub-carrier signal being always fixed. Therefore, a composite video signal V suitable for the NTSC standard is produced as in the conventional circuit.

An operation of the embodiment when PAL is selected will be described with reference to waveforms shown in FIG. 2.

The composite video signal V is synthesized by the composite video signal synthesizer circuit 5 from the horizontal synchronizing signal HSYNC, the burst signal B, a luminance signal Y and a chrominance signal C.

When PAL is selected, phases of the burst signal B and the sub-carrier signal are inverted for every scan line, respectively. The phase inversion is reflected in FIG. 2 as phase differences of portions Ba and Bb of the burst signal waveform B.

The first flip-flop 20b of the selection signal generator circuit 20 is set by a leading edge of the BFP pulse and outputs the signal S to the second flip-flop 20c while storing it as a logical value "1". The second flip-flop 20c is not reset by the selection signal Z of "L".

Figure 2:
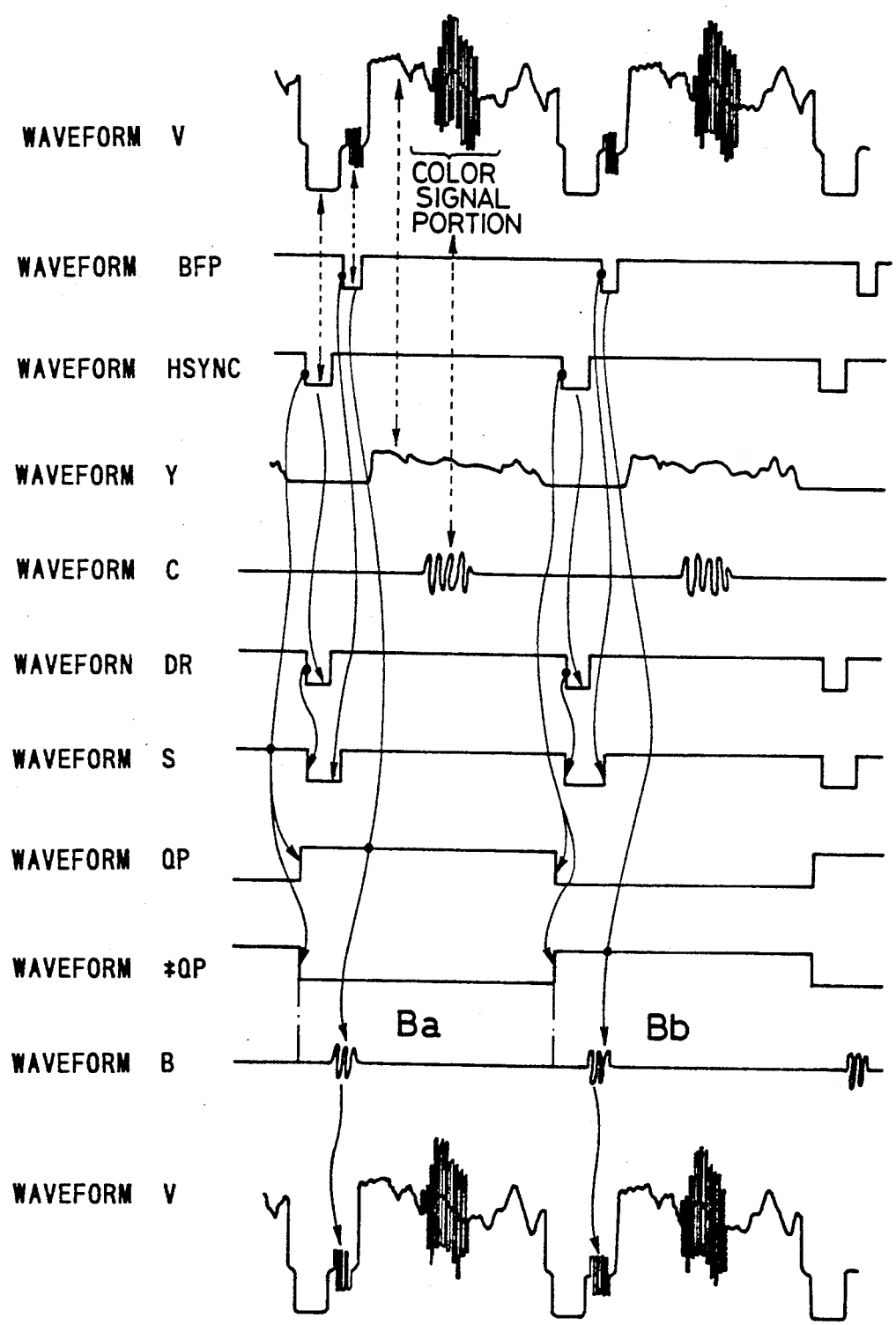
FIG. 2 shows waveforms for explanation of an operation of the video signal generator circuit shown in FIG. 1.

When the second flip-flop 20c receives the signal S and the horizontal synchronizing signal HSYNC simultaneously, its output "1" or "0" is inverted at a leading edge of the horizontal synchronizing signal HSYNC to "0" or "1" as shown by the waveforms QP and *QP in FIG. 2. Further, after the signal S is input to the second flip-flop 20b is reset by a trailing edge of the signal DR which is the horizontal synchronizing signal HSYNC delayed by the delay circuit 20a and set by the next burst flag pulse BFP. As a result, the second flip-flop 20c is inverted in its state by the horizontal synchronizing signal HSYNC for every BFP pulse and repeats this operation for every scan line. Therefore, the switching of the sub-carrier signal is performed immediately before the leading edge of the BFP pulse as shown by the waveforms BFP, QP and *QP.

With the switching of the output of the second flip-flop 20c between QP and *QP for every scan line, the sub-carrier signal generator circuit 3 outputs the burst phase signals P having phases of 90° and 270°, alternately. Since the horizontal synchronizing signal HSYNC is a signal indicative of a start of each scan line, the phase of a burst signal B generated based on the burst phase signal P by the switching is inverted for every scan line.

As described, when PAL is selected, the sub-carrier signal is switched immediately before the trailing edge of the BFP pulse. Further, the BFP even number setting circuit 10b sets the number of BFP pulses to an even number upon the selection signal Z of "L". Therefore, when the phase of the sub-carrier generated correspondingly to the first horizontal synchronizing signal HSYNC in each field is, for example, a 90° phase signal, the phase thereof in the next field will become a 90° phase signal. This is also true for the 270° phase signal. Therefore, for each field, the relation between the generation point of the horizontal synchronizing signal HSYNC and the phase of sub-carrier corresponding thereto is never changed.

Since each BFP pulse is generated for each scan line, it is not supplied to the selection signal generator circuit 20 in a period between adjacent frames. Therefore, the first flip-flop 20b which is reset by the equalizing pulse is not set in this period and there is no signal S generated. Therefore, even if there is an equalizing pulse, the state of the selection signal QP and *QP which is the output of the second flip-flop 20c is not changed.

Since the output is not influenced by the equalizing pulse, it operates according to the PAL standard.

Figure 3:
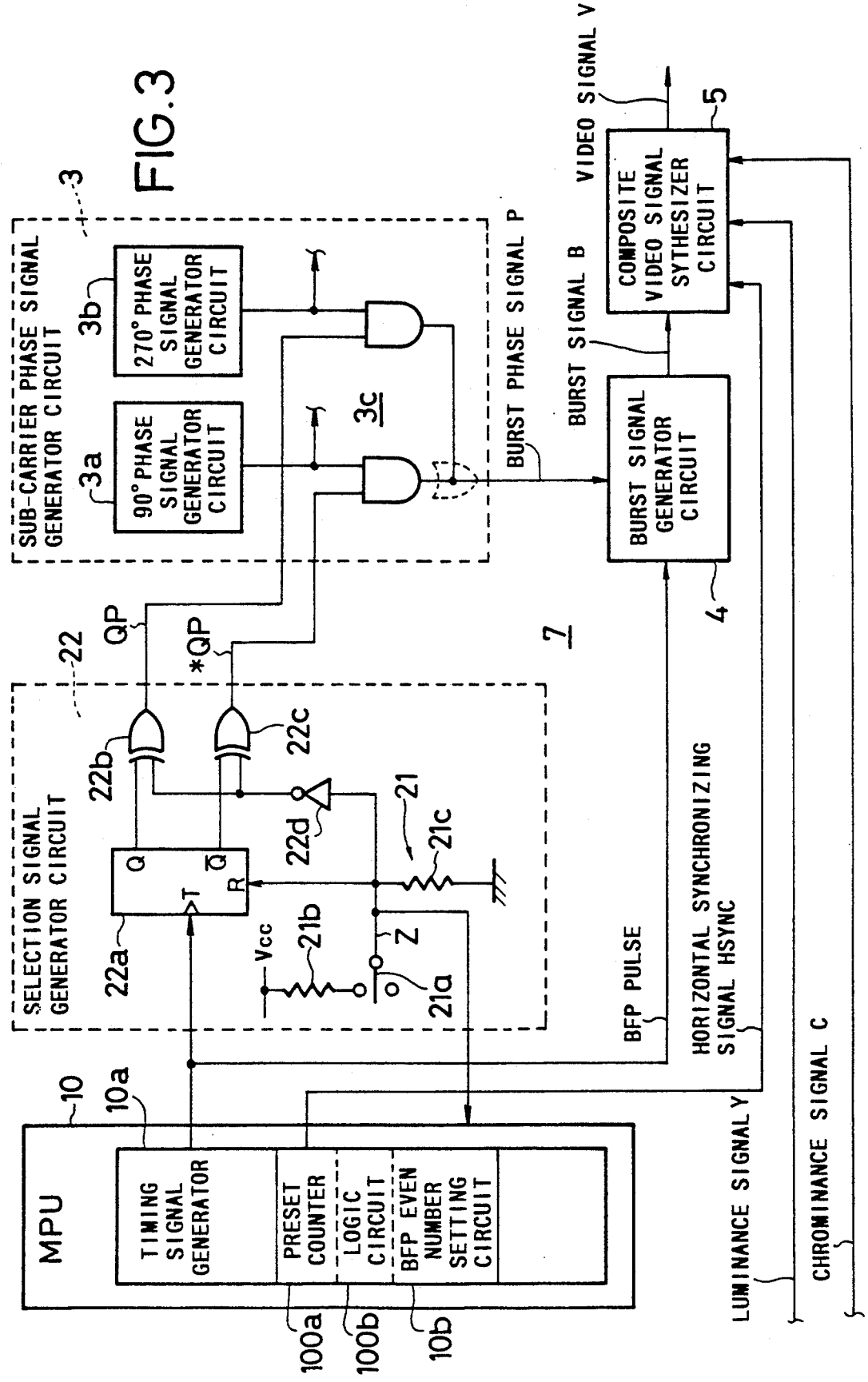
FIG. 3 is a block circuit diagram of another embodiment of the present invention.

FIG. 3 shows another embodiment of the present invention in which Exclusive-OR gates are used as a timing circuit and the switching of the sub-carrier is performed after a BFP pulse when PAL is selected. In this embodiment, the delay circuit 20a and the second flip-flop 20c in the first embodiment shown in FIG. 1 can be removed.

In FIG. 3, a selection signal generator circuit 22 includes a toggle type flip-flop 22a and Exclusive-OR gate circuits 22b and 22c and generates phase selection signal QP, *QP in response to a BFP pulse. The flip-flop 22a is triggered by a trailing edge of the BFP pulse received at its toggle input T. The flip-flop 22a also receives a selection signal Z at its reset terminal R. The Q output and *Q output thereof are supplied at one of the inputs of the gate circuits 22b and 22c, respectively.

The selection signal Z is supplied to not only the MPU 10 but also the other inputs of the gate circuits 22b and 22c through an inverter 22d, respectively. The Exclusive-OR gate circuits 22b and 22c receive "L" from the inverter 22d when the selection signal Z indicates NTSC and the flip-flop 22a is reset. When the output of the inverter 22d is "L", the gate circuit 22c provides "H" causing the 90° phase signal to be kept selected.

When the selection signal Z indicates PAL, this becomes "L". Therefore, the flip-flop 22a is not reset. On the other hand, this selection signal Z is supplied to the MPU 10 and therefore the BFP even number setting circuit 10b is activated so that the number of BFP pulses in one field becomes even.

Since the flip-flop 22a is not in a reset state, the Q output and *Q output of the flip-flop 22a are inverted for every BFP pulse. At this time, the other inputs of the gate circuits 22b and 22c supplied through the inverter 22d are "H". Therefore, for example, the gate 22b outputs "H" and the gate 22c outputs "L", and the burst phase signal P is switched between the 90° phase signal and the 270° phase signal for every BFP pulse.

Figure 4:
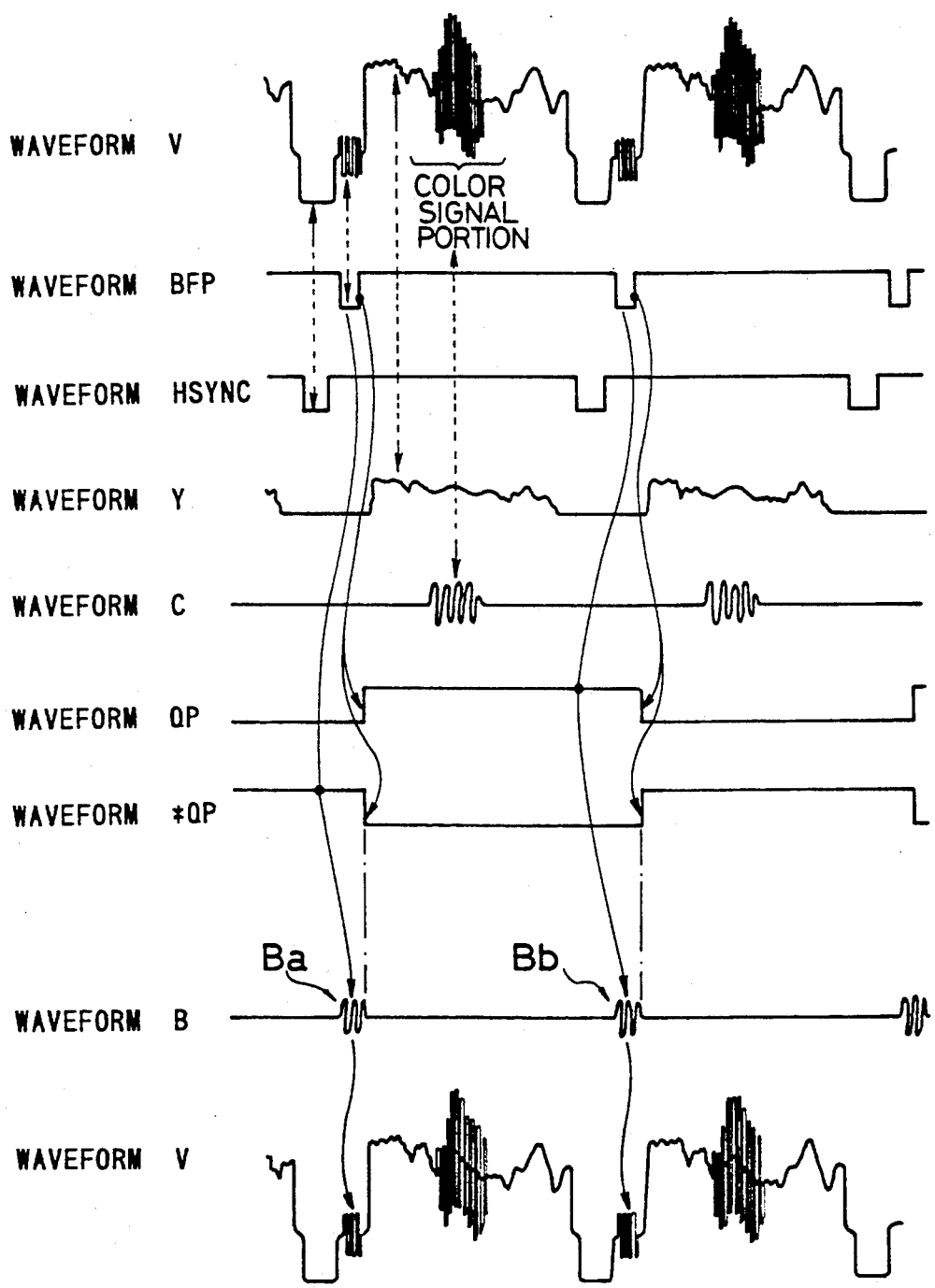
FIG. 4 shows waveforms for explanation of an operation of the video signal generator circuit shown in FIG. 3.

FIG. 4 shows waveforms for explanation of this operation. As can be understood by referring to the relation between the waveform BFP and the waveforms QP and *QP, the switching of the sub-carrier is performed at a trailing edge of the BFP pulse. Therefore, the Exclusive-OR gate circuits 22b and 22c with the selection signal Z constitute a timing circuit for switching the sub-carrier for every BFP pulse at a timing after the trailing edge of the BFP pulse.

In the color video signal generator circuit 7 having construction as mentioned above, it is possible to generate a burst signal B and a sub-carrier signal having suitable phase to either PAL or another system selected by merely setting the value of the selection signal Z to "H" or "L" at a time of incorporating it in a device or regulating the device. As a result, it is possible to generate a composite video signal V suitable to the standard of either system. Although, in the above description, the sub-carrier signal is limited to the 90° phase signal and the 270° phase signal for simplicity of explanation, it is possible to use a 0° phase signal in practice. Since such 0° phase signal is used in a conventional manner and is out of this invention, details thereof is omitted in this description.

Although, in the described embodiments, the number of scan lines is 625, it is not limited thereto so long as it is an odd number. In a case of interlace, it becomes 625/2. In such case, when the number of horizontal scan line is an odd number such as 313 or 311, the number of BFP pulses should be set to 314 or 312 by means of the BFP even number setting circuit 10.

While a preferred embodiment has been set forth with specific details, further embodiments, modifications and variations are contemplated according to the broader aspects of the present invention, all as determined by the spirit and scope of the following claims.

What is claimed is:

1. A video signal generator circuit for generating a color video signal suitable to a first or a second television system selected externally, said video signal generator circuit comprising:
    a sub-carrier signal generator circuit for generating a first color sub-carrier signal of a first phase and a second color sub-carrier signal of a second phase different from said first phase by 180° and for outputting either said first color sub-carrier signal or said second color sub-carrier signal according to a first selection signal;
    a burst signal generator circuit responsive to a burst flag pulse and an output of said sub-carrier signal generator circuit for outputting said output as a burst signal during a period of said burst flag pulse;
    a state memory circuit responsive to a second selection signal indicative of either the first television system or the second television system selected according to an external setting operation and adapted to be set to a logical "1" or "0" state when said second selection signal indicates that the first television system is selected, the state of said state memory circuit being alternated between "1" and "0" according to said burst flag pulse when said second selection signal selects said second television system; and
    a timing circuit for outputting said state of said state memory circuit at a timing before a leading edge of said burst flag pulse or after a trailing edge of said burst flag pulse;
    whereby said video signal generator circuit responds to an even number of burst signals in one frame and generates a color video signal suitable to the first or the second television system according to said second selection signal.

2. The video signal generator circuit claimed in claim 1, wherein said state memory circuit comprises a flip-flop which is reset when said second selection signal indicates a selection of the first television system and wherein said timing circuit comprises a delay circuit for delaying an externally supplied horizontal synchronizing signal and a circuit for supplying said horizontal synchronizing signal to said flip-flop.

3. The video signal generator circuit claimed in claim 1, wherein said state memory circuit comprises a flip-flop which is reset when said second selection signal indicates a selection of the first television system and wherein said timing circuit comprises a logic circuit having inputs supplied with said second selection signal and an output of said flip-flop.

4. The video signal generator circuit claimed in claim 3, wherein said logic circuit comprises an Exclusive-OR circuit.

5. The video signal generator circuit claimed in claim 1, wherein said first color sub-carrier having said first phase is a 90° phase signal having a phase of 90° with respect to a B-Y signal axis of a television system as a reference, said second color sub-carrier having said second phase is a 270° phase signal having phase of 270° with respect to said B-Y signal axis, said first television system is a NTSC television system and said second television system is a PAL television system.

6. A video signal generator circuit for generating a color video signal suitable to a first or a second television system selected externally, said video signal generator circuit comprising:
    a sub-carrier signal generator circuit for generating a first color sub-carrier signal of a first phase and a second color sub-carrier signal of a second phase different from said first phase by 180° and for outputting either said first color sub-carrier signal or said second color sub-carrier signal according to a first selection signal;
    a burst signal generator circuit responsive to a burst flag pulse and an output of said sub-carrier signal generator circuit for outputting said output as a burst signal during a period of said burst flag pulse;
    a first flip-flop adapted to be reset by a horizontal synchronizing signal delayed by a time before generation of said burst flag pulse and not overlapping with said burst flag pulse and to be set at a leading edge of said burst flag pulse; and
    a second flip-flop adapted to be reset by a second selection signal generated by an external setting operation and indicative of either a first television system or a second television system selected thereby, when said second selection signal indicates the first television system, and adapted to be inverted at a leading edge of said horizontal synchronizing signal to generate said first selection signal when said second selection signal indicates the second television system and said first flip-flop is set and not inverted when said second selection signal indicates the second television system and said first flip-flop is reset;
    whereby said video signal generator circuit responds to an even number of burst signals in one frame and generates a color video signal suitable to the first or the second television system according to said second selection signal.

7. The video signal generator circuit claimed in claim 6, further comprising a delay circuit for delaying said horizontal synchronizing signal by a time before the generation of said burst flag pulse and not overlapping with said burst flag pulse and wherein said first flip-flop receives said delayed horizontal synchronizing signal at its reset terminal and said second flip-flop receives said horizontal synchronizing signal at its trigger terminal, provides its Q output as a signal selecting said first color sub-carrier signal and *Q output as a signal selecting said second color sub-carrier signal.

8. The video signal generator circuit claimed in claim 7, wherein said delay circuit and said second flip-flop receive said horizontal synchronizing signal from a processor for generating timing control signals for television signal and said first flip-flop comprises a data latch type flip-flop having a data terminal set to "1" and a trigger terminal supplied with said burst flag pulse from said processor and provides a Q output to a set terminal of said second flip-flop.

9. The video signal generator circuit claimed in claim 8, further comprising a composite video signal synthesizer circuit responsive to a luminance signal, a chrominance signal, said horizontal synchronizing signal and said output of said burst signal generator circuit for generating said color video signal.

10. A video image processing apparatus for selectively generating a video signal for either a first television system of a second television system, which includes a sub-carrier signal generator circuit for generating a first color sub-carrier having phase of 90° with respect to a B-Y signal axis of a television system as a reference and a second color sub-carrier having phase of 270° with respect to said B-Y signal axis and selecting and outputting either said first or said second color sub-carrier signal according to a color sub-carrier selection signal, a processor for controlling timings for television signal and generating a burst flag pulse, a burst signal generator circuit responsive to the burst flag pulse from said processor and an output of said sub-carrier signal generator circuit for outputting said output as a burst signal during a period of said burst flag pulse and a composite video signal synthesizer circuit responsive to a horizontal synchronizing signal, a luminance signal and a chrominance signal from said processor and an output of said burst signal generator circuit for generating a color video signal, said video signal processing apparatus comprising:

a first flip-flop adapted to be reset by a horizontal synchronizing signal delayed by a time before generation of said burst flag pulse and not overlapping with said burst flag pulse and to be set at a leading edge of said burst flag pulse;

a second flip-flop adapted to be reset by a second selection signal generated by an external setting operation and indicative of either the first television system or the second television system selected thereby, when said second selection signal indicates the first television system, and adapted to be inverted at a leading edge of said horizontal synchronizing signal to generate said first selection signal when said second selection signal indicates the second television system and said first flip-flop is set and not inverted when said second selection signal indicates the second television system and said first flip-flop is reset; and a timing circuit for outputting a state of said first flip-flop at a timing before a leading edge of said burst flag pulse or after a trailing edge of said burst flag pulse; and wherein said processor generates an even number of said burst flag pulses in one frame.

11. A color video signal generator circuit for generating a color video signal suitable to a first or a second television system selected externally, which includes a sub-carrier signal generator circuit for generating a first color sub-carrier signal of a first phase and a second color sub-carrier signal of a second phase different from said first phase by 180° and for outputting either said first color sub-carrier signal or said second color sub-carrier signal according to a color sub-carrier selection signal, and a burst signal generator circuit responsive to a burst flag pulse and an output of said sub-carrier signal generator circuit for outputting said output as a burst signal during a period of said burst flag pulse, said color video signal generator comprising:

a flip-flop adapted to be reset when said system selection signal selects the first television system and inverted at a trailing edge of said burst pulse when said system selection signal selects the second television system; and a gate circuit for outputting an output of said flip-flop as said color sub-carrier selection signal when said system selection signal selects the first television system, and an inversion of said output of said flip-flop as said color sub-carrier selection signal when it selects the second television system, wherein said color video signal generator receives an even number of said burst flag pulses in one frame.

12. A video image processing apparatus for selectively generating a video signal for either a first television system or a second television system, which includes a sub-carrier signal generator circuit for generating a first color sub-carrier having phase of 90° with respect to a B-Y signal axis of a television system as a reference and a second color sub-carrier having phase of 270° with respect to said B-Y signal axis and selecting and outputting either said first or said second color sub-carrier signal according to a color sub-carrier selection signal, a processor for controlling timings for television signal and generating a burst flag pulse, a burst signal generator circuit responsive to a burst flag pulse from said processor and an output of said sub-carrier signal generator circuit for outputting said output as a burst signal during a period of said burst flag pulse and a composite video signal synthesizer circuit responsive to a horizontal synchronizing signal, a luminance signal and a chrominance signal from said processor and an output of said burst signal generator circuit for generating a color video signal, said video signal processing apparatus comprising:

a flip-flop adapted to be reset when said system selection signal selects the first television system and inverted at a trailing edge of said burst pulse when said system selection signal selects the second television system; and a gate circuit for outputting an output of said flip-flop as said color sub-carrier selection signal when said system selection signal selects the first television system, and an inversion of said output of said flip-flop as said color sub-carrier selection signal when it selects the second television system, wherein said color video signal generator receives an even number of said burst flag pulses in one frame.

* * * * *